United States Patent
Lermuzeaux

(10) Patent No.: US 6,745,100 B1
(45) Date of Patent: Jun. 1, 2004

(54) COMPUTERIZED SYSTEM FOR GENERATING A TOOL PATH FOR A POCKET

(75) Inventor: Etienne Lermuzeaux, Osny (FR)

(73) Assignee: Dassault Systemes, Suresnes Cedex (FR)

( * ) Notice: Subject to any disclaimer, the term of this patent is extended or adjusted under 35 U.S.C. 154(b) by 484 days.

(21) Appl. No.: 09/594,400

(22) Filed: Jun. 15, 2000

(51) Int. Cl.[7] .............................................. G06F 19/00
(52) U.S. Cl. ...................... 700/187; 700/159; 700/176; 700/182
(58) Field of Search ................ 700/159, 172, 700/176, 182, 185, 187, 189, 191, 192, 190, 193

(56) References Cited

U.S. PATENT DOCUMENTS

| | | | | |
|---|---|---|---|---|
| 4,651,599 A | * | 3/1987 | Ley ................................. 82/18 |
| 4,739,489 A | * | 4/1988 | Kishi et al. .................. 700/191 |
| 4,949,270 A | * | 8/1990 | Shima et al. ................ 700/184 |
| 5,015,130 A | * | 5/1991 | Matsuura et al. ............. 409/80 |
| 5,223,777 A | * | 6/1993 | Werner et al. ............... 318/569 |
| 5,289,383 A | * | 2/1994 | Sawamura et al. .......... 700/187 |
| 5,363,308 A | * | 11/1994 | Guyder ........................ 700/187 |
| 5,595,463 A | * | 1/1997 | Takegahara et al. ........ 409/132 |
| 5,602,748 A | * | 2/1997 | Seki et al. ................... 700/187 |
| 6,112,133 A | * | 8/2000 | Fishman ...................... 700/182 |
| 6,447,223 B1 | * | 9/2002 | Farah et al. ................. 409/132 |

\* cited by examiner

Primary Examiner—Leo Picard
Assistant Examiner—Chad Rapp
(74) Attorney, Agent, or Firm—James V. Mahon; Clifford Chance US LLP

(57) ABSTRACT

A method and system for generating a path to be followed by a cutting tool in a milling situation. Using a novel geometric concept suited to a milling situation called "focal areas," a toolpath is generated in which the cutting tool remains in constant contact with material to be cut, thus minimizing wear and shock loading of the tool. In addition, the toolpath is optimized so as to trace a short path, thereby minimizing cutting time. The toolpath generator is particularly useful in high speed milling applications.

12 Claims, 19 Drawing Sheets

Classical Helical Toolpath    New Helical Toolpath for HSM

1

2

3

4

Recovering coefficient (rcoef) varies between 0 and 1 and corresponds to the recovering between passes.

Recovering radius = R1 * rcoef
Or
Recovering radius = R2 * rcoef

Tool section

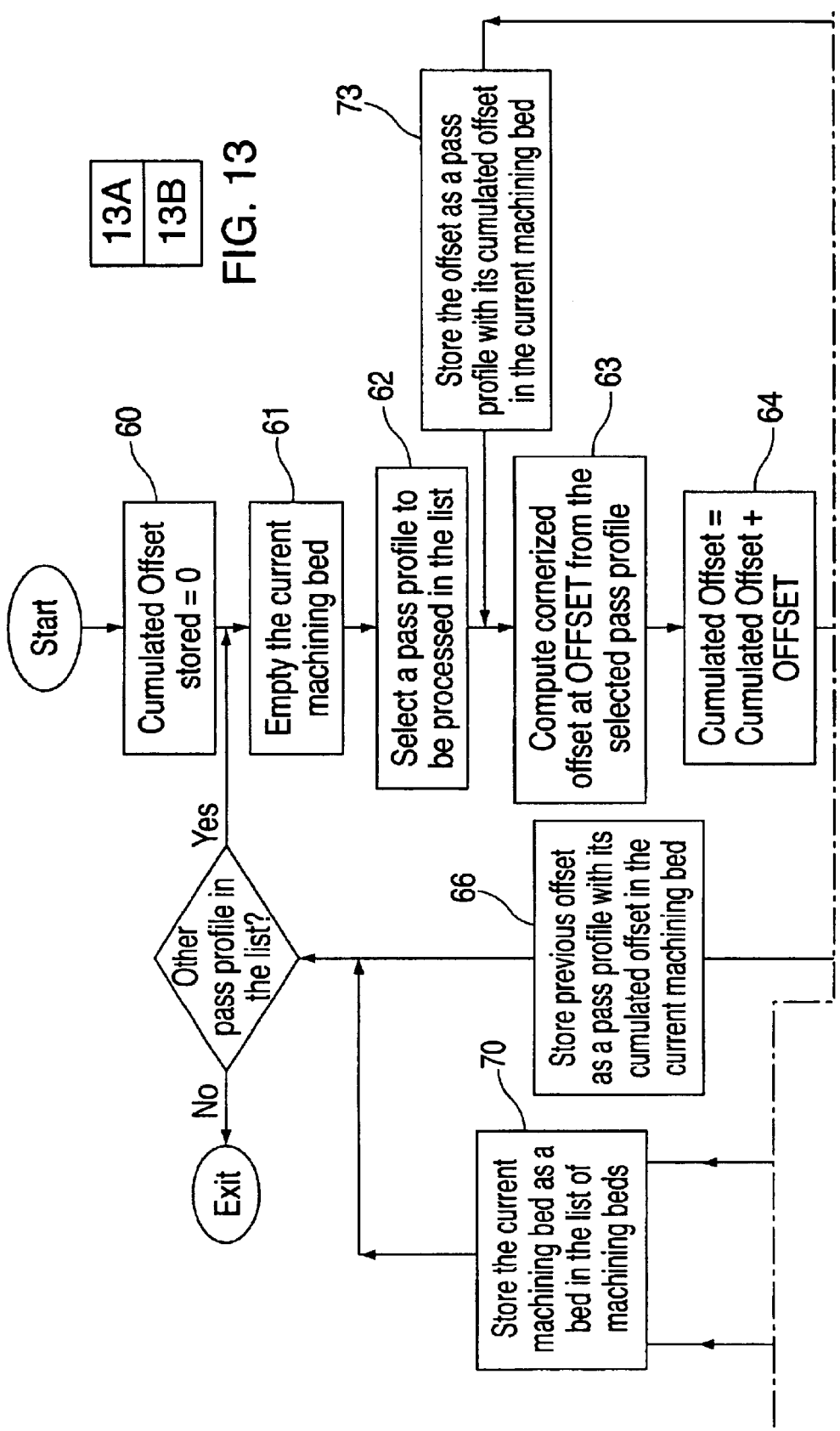

COMPUTERIZED SYSTEM FOR GENERATING A TOOL PATH FOR A POCKET

BACKGROUND

The present invention relates to computer software utility programs, and more specifically to programs in the field of computer aided design (CAD), computer aided manufacturing (CAM), and computer aided engineering (CAE), and in particular the use of such systems for numerically controlled machining and the generation of a toolpath for such numerically controlled machining. The invention is particularly useful with, although not restricted to, high speed machines for High Speed Milling (HSM).

The general objective to be achieved in defining a toolpath is to ensure that all the material that has to be cut from a workpiece to achieve a pocket of a desired shape is indeed cut when the tool has followed the defined path. A toolpath generator generates planar tool motion in a succession of one or more parallel planes going from the top of the pocket down to the bottom.

Several types of toolpaths have been proposed in the art. One is called the helical toolpath which is comprised of a series of passes where each pass is derived from the previous one by applying a predefined offset. This is depicted in FIG. 1 in the left-hand view, entitled "Classical Helical Toolpath." The passes can start from the external side of the pocket (inward offsetting) or from the center of the pocket (outward offsetting). The toolpath obtained with classical toolpath generators give sharp angles and big variations in cutting directions. New machines dedicated to HSM are now able to reach high spindle speeds with fast cutting speed. For such machines, sharp angles and big variations in cutting directions should be avoided to prevent tool or machine breakage.

An important parameter affecting efficiency when cutting a pocket in a part is the distance between successive passes expressed in terms of its relation to the diameter of the tool. Obviously, the distance cannot be greater than the tool diameter as this would necessarily leave some material uncut. On the other hand, the efficiency of the machine is severely reduced if the distance is much smaller than the diameter. Most toolpath generators currently on the market provide for a distance between adjacent passes which is half the diameter of the tool. It would be advantageous to increase this distance to have it equal to or as close as possible to the diameter of the tool.

Another difficulty with the currently known helical toolpath is the presence of sharp angles and big variations in the direction of cutting. This is not desirable even with conventional milling machines, and becomes a very serious problem with new high speed milling machines since it can lead to tool or machine breakage. To avoid this, current toolpath generators provide for a lower rotation speed of the tool when approaching a change of direction. However, this leads to a considerable loss of time in the process.

A further difficulty in HSM is the occurrence of segments in the toolpath where the tool passes a location that has already been cut. This causes shock loading of the machine as the tool suddenly finds itself in an area from which the material has already been removed. In known toolpath generators, this can occur, for example, when the tool has finished one pass and moves to the next one.

Although the classical helical toolpath works reasonably well with simple pockets, such as the parallelogram of FIG. 1, it is far less efficient when the desired pocket exhibits a complex shape such as the shape of the pocket of FIG. 2.

There is therefore a need for a toolpath generator which addresses the above problems, and provides an efficient toolpath which protects the cutting machine and tool, while at the same time minimizing cutting time.

SUMMARY OF THE INVENTION

Accordingly, the present invention provides a system, method and apparatus for determining an optimized toolpath in a milling situation. According to the invention, the machining time for a given task is minimized, wear of both the machine and the cutting tool is reduced and shock loading is avoided. An improved toolpath is generated which ensures a progressive tool engagement and regular distribution of passes, taking into account a minimum circle radius, with no hard direction variation, leading to regular cutting force variation. The toolpath generator has ramping approach material capabilities and is able to keep contact with the material throughout the cutting. In addition, a large portion of the tool diameter is engaged in material during the cutting.

The new helical toolpath generator of the present invention machines the material in several horizontal slices. All the cutting motions in a same plane are based on rules so that:

Tool engagement in material is progressive for each approach

The toolpath respects a minimum radius constraint

During cutting motion, the tool stays in contact with material

The tool retracts from the part along a circular-based helix.

A toolpath generated according to the present invention is therefore useful for controlling High Speed Milling machines, but can also be used for usual machines. Using this technology results in a dramatic decrease in machining time and reduces the wear on the machine and the cutting tool. An important feature of the present invention is the concept of focal areas, for determining the relative centroid of portions of the pocket to be cut, and the concept of machining beds for defining portions of the pocket to be cut.

A depiction of a toolpath generated according to the present invention is shown in FIG. 1, in the right-hand view, entitled, "New Helical Toolpath for HSM."

DETAILED DESCRIPTION OF THE INVENTION

Figure 3:
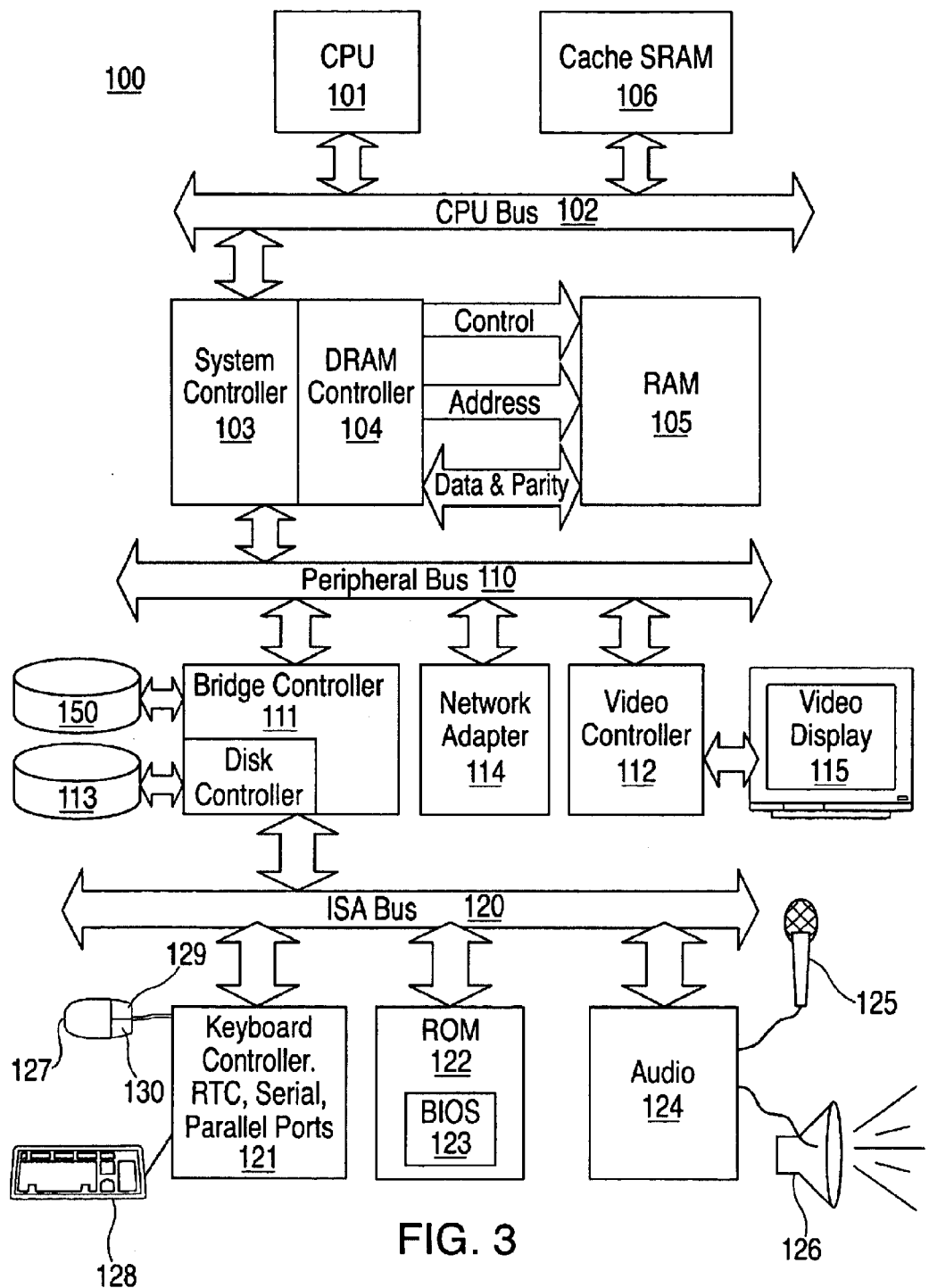
FIG. 3 is a block diagram of a computer capable of use in implementing the present invention.

Referring to FIG. 3 physical resources of a computer system 100 capable of use in practicing the present invention are depicted. The computer 100 has a central processor 101 connected to a processor host bus 102 over which it provides data, address and control signals. The processors 101 may be any conventional general purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS™ operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of designs and toolpaths on the video computer display 115.

Description of Concepts Used in the Invention

We begin by describing a number of concepts used in the present invention:

extra-segment notion cornerization notion minimum distance between passes focal area(s) of a pocket machining bed(s)

start points, end points machining bed sequencing

Extra Segment Notion

Figure 4:
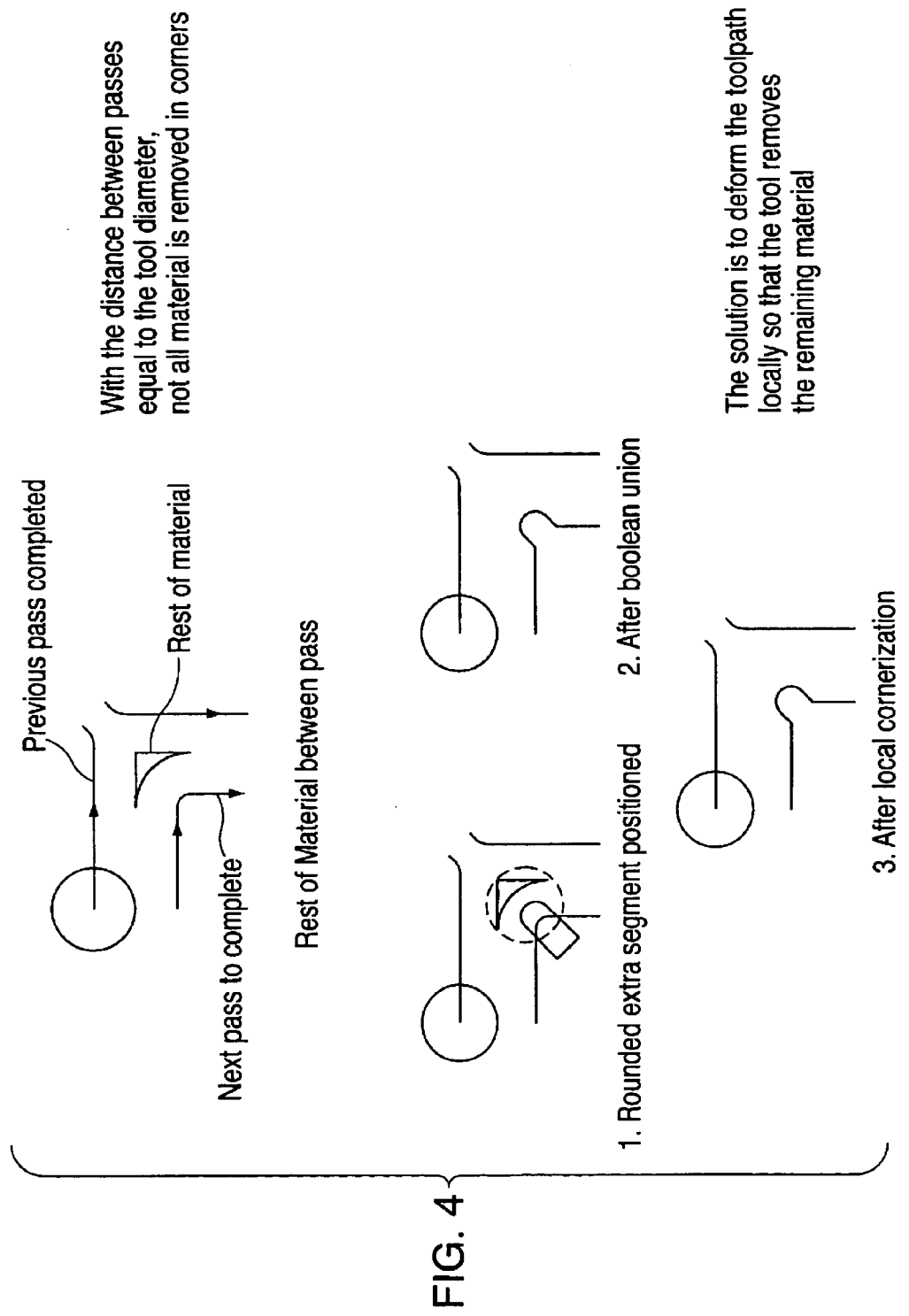
FIG. 4 is a graphic depiction illustrating the concept of adding an extra segment, or "beak," in the toolpath to ensure that all material in a corner is cut by the tool.

Referring to FIG. 4, it is graphically seen that when the distance between passes of the tool is equal to or close to the diameter of the cutting tool, a problem arises in corners in that not all of the material is cut. In order to ensure that all of the material is removed, a deformation or "beak" in the toolpath is added as an extra-segment in the toolpath at some or all of the changes of direction, as shown in the lower three drawings of FIG. 4.

Cornerization Notion

It is undesirable to prescribe a toolpath which has sharp corners, or corners having a small radius. In order to prevent this occurrence, the concept of "cornerization" is used. As discussed, the passes of the toolpath generally will follow a path defined by following the contour of the preceding path and applying a predefined offset. In the case where following such a path results in a corner that is too sharp, the cornerization technique is used to round off, or "cornerize," the toolpath. This is described with respect to FIG. 5. As seen therein, to cornerize the toolpath, the value for a minimum corner radius is added to the offset between passes to arrive at an interim toolpath. The value for the corner radius is then subtracted from the interim toolpath. This leads to a more rounded toolpath than would result if the offset were used alone. For example, focusing on FIG. 5, to obtain a 5 mm cornerized toolpath at 25 mm from the previous toolpath, and inward offset of 30 mm is applied, followed by a 5 mm outward offset.

Minimum Distance Between Passes

The distance between passes is measured as either the distance between the paths followed by the center of the cutting tool in two successive passes or the difference between the distances of the center of the tool to the center of the pocket in two successive passes. The minimum distance between passes is a parameter that the user defines and which must be exceeded at all points in the generated toolpath. A likely example of a minimum distance between passes is the radius (or half the diameter) of the tool. The distance between passes which the generator will seek to achieve lies between this minimum distance and the distance corresponding to the diameter of the tool, which is, of course, the upper limit to ensure that all the required material is removed. The invention aims at having in all but exceptional cases the distance between passes nearly equal to the diameter of the tool, as this provides the shortest machining time for a given task.

Focal Areas

A focal area of a pocket is the smallest area within the pocket (or part of a pocket) towards which the passes will progress through a series of inward offsets, beginning at the outer edge of the pocket. The focal area(s) of a pocket are uniquely determined by a given distance between passes and the minimum acceptable size for a focal area. A focal area is characterized by its geometry and by the cumulated offset from it to the external contour of the pocket.

Figure 1:
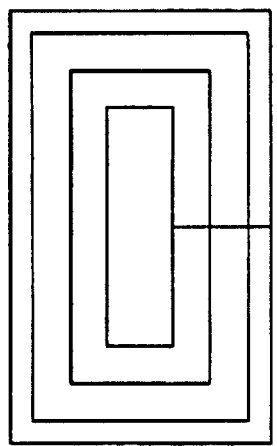
FIG. 1 is a depiction of a helical toolpath known in the prior art, and a new helical toolpath for high speed milling, generated in accordance with the present invention.
Figure 1:
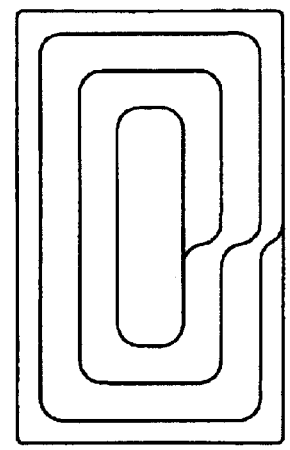

A pocket may have one or more focal areas but the concept of focal areas applies to all sorts of pockets, whatever their shape and complexity. A simple pocket, such as a circular or oval pocket, or the rectangular pocket of FIG. 1, has only one focal area. The peanut-shaped pocket of FIG. 2 has two focal areas. More complex pockets can have many more focal areas due to their particular shape. Where a complex pocket exhibits one or more "islands," there are several possible ways of going about determining the focal areas. The preferred way is to take the islands into account at the latest possible stage in the focal area determination process, which results in the focal areas being as close as possible to the islands with inward offsetting or as remote as possible from them in outward offsetting. Another solution would be to take the islands into account from the very beginning of the focal area determination process, which would result in the focal areas being approximately at the same distance from the islands and from the external edges of the pocket.

During actual machining, a focal area may appear in its original form or with extra segments in the corners as explained above.

Machining Beds

Figure 2:
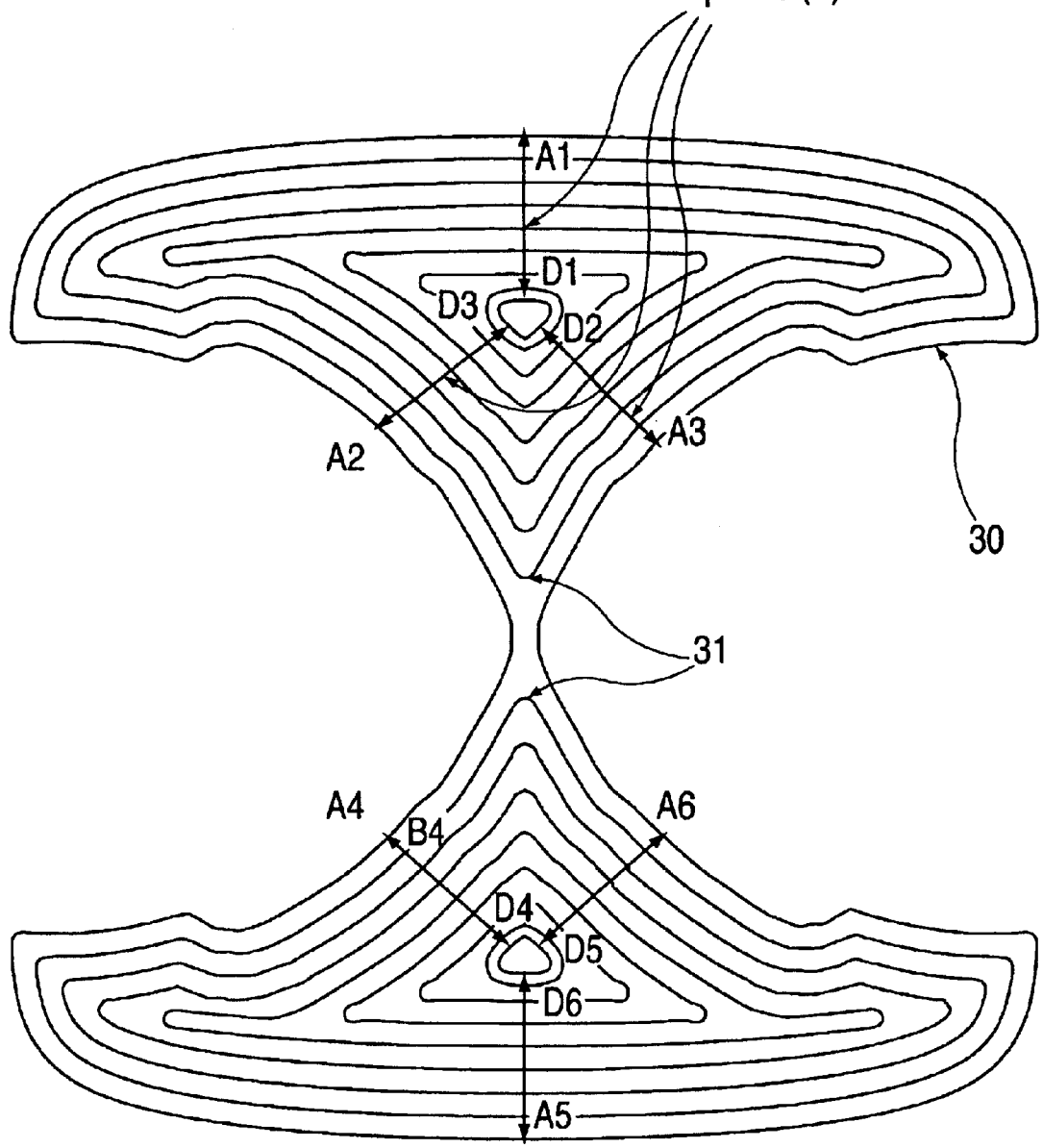
FIG. 2 is an illustration showing a pocket with a series of contours, and two focal areas.

In the context of the invention, the concept of a machining bed is best understood by referring to FIG. 2. Referring to FIG. 2, three machining beds are shown. The first machining bed depicted is the single continuous external contour. The single external contour 30 defines a machining bed because if a new contour is drawn inside that single continuous contour at a set offset distance from the single external continuous contour, that new contour will overlap itself. To prevent an overlap, the new contour is connected to itself at the points of overlap 31, which leads to the formation of two separate contours, rather than one single continuous contour. Thus, referring to FIG. 2, there are three machining beds. One machining bed is the single continuous external contour 30 alone, since the next inward offset leads to two different contours and are therefore not part of the same machining bed. The other two machining beds are the two series of contours leading by successive inward offsets to the focal areas in each of the wider portions of the pocket. With respect to the single continuous external contour, it should be understood that the single continuous external contour could in fact be the last one of a series of contours external to the single external contour shown in the figure. In that case, each of the contours external to the single external continuous contour shown in the figure would be part of the same machining bed as the single external continuous contour shown in the figure.

Machining beds can be of several types. A machining bed will be termed a "first" machining bed if it does not result from the offsetting of a contour in another machining bed. A machining bed will be termed "terminal" if it ends up with a focal area. A machining bed containing only one contour will be termed "singular." The typical machining bed will result from another machining bed and will include one or more other machining beds. In the simplified example of FIG. 2, the single continuous external contour 30 shown is both "first" and "singular," while the other two are "terminal."

Working with Focal Areas and Machining Beds

According to the invention, the focal areas of a given pocket are first determined, then the various machining beds are determined. That is to say, the various contours constituting each machining bed are determined on the basis of the chosen offset.

It may happen that during the definition of a contour the contour comes too close to a focal area. According to the invention, there are two categories of contour that fit the definition of coming too close to a focal area. The first situation occurs when the contour actually falls inside the bounds of the focal area. In this case the cumulated offset of the contour would be greater than the cumulated offset of the focal area. This situation is termed a Type 1 situation, and the solution to the problem is to redefine the portion of the contour that is in the vicinity of the focal area so that it follows the outline of the focal area itself. In this case, the contour becomes a union of 1) the contour with the standard offset in those places that are not too close to a focal area, and 2) the boundary of the focal area itself in those places near the focal area.

A Type 2 situation occurs when, although the new contour is not within the boundary of the focal area itself, it comes so close that the difference between the cumulated offset of the focal area, and the cumulated offset of the new contour is less than the minimum distance between passes. In this case, the new contour is unacceptable because the next contour will result in a pass in which the tool cuts too little material. Therefore, to alleviate the problem, the focal area is "inflated."

This concept is shown by reference to FIG. 6. In FIG. 6a a contour including two focal areas is depicted. FIG. 6b shows another contour drawn inside the contour of FIG. 6a inwardly offset at the offset distance from the contour of FIG. 6a. The new contour of FIG. 6b is too close to the focal area F2, in that its distance from the focal area is less than a predefined minimum distance between passes. It is therefore a Type 2 situation. In this case, the focal area is inflated in the amount of half the distance between the focal area and the contour that generated the offset. This inflation is shown in FIG. 6c. In this case, the inflated focal area totally incorporates the offset. Therefore, the inflated offset defines a new offset contour in the vicinity of the focal area. FIG. 6d shows the new offset after it has been cornerized, as described above.

Start and End Points

It is useful to define for the user the preferred points for starting (inward offsetting) or ending (outward offsetting) the process. These are the points on the contour of the focal area or the external contour of the pocket at which the distance between the focal area and the external contour is equal to the total cumulative offset (although, in practice, the points presented to the user will be shifted from these theoretical points to take into account the inclination of the transitions between passes). FIG. 2 shows the possible points (6 in this particular case). Once the ending point is selected, say A3, the start points associated with the end focal area, namely D1, D2, D3 are rejected. Assuming D4 is selected as a start point, the process could then be as follows: start ramping approach at D4 for the terminal machining bed corresponding to the lower portion focal area, machining this bed up to point B4 where the tool is extracted, ramping approach at D3 and ending/extraction at A3.

Note that the first two machining beds were handled without having to extract the tool from the pocket. The two machining beds are said to have been merged.

Other Characteristic Points

Figure 7:
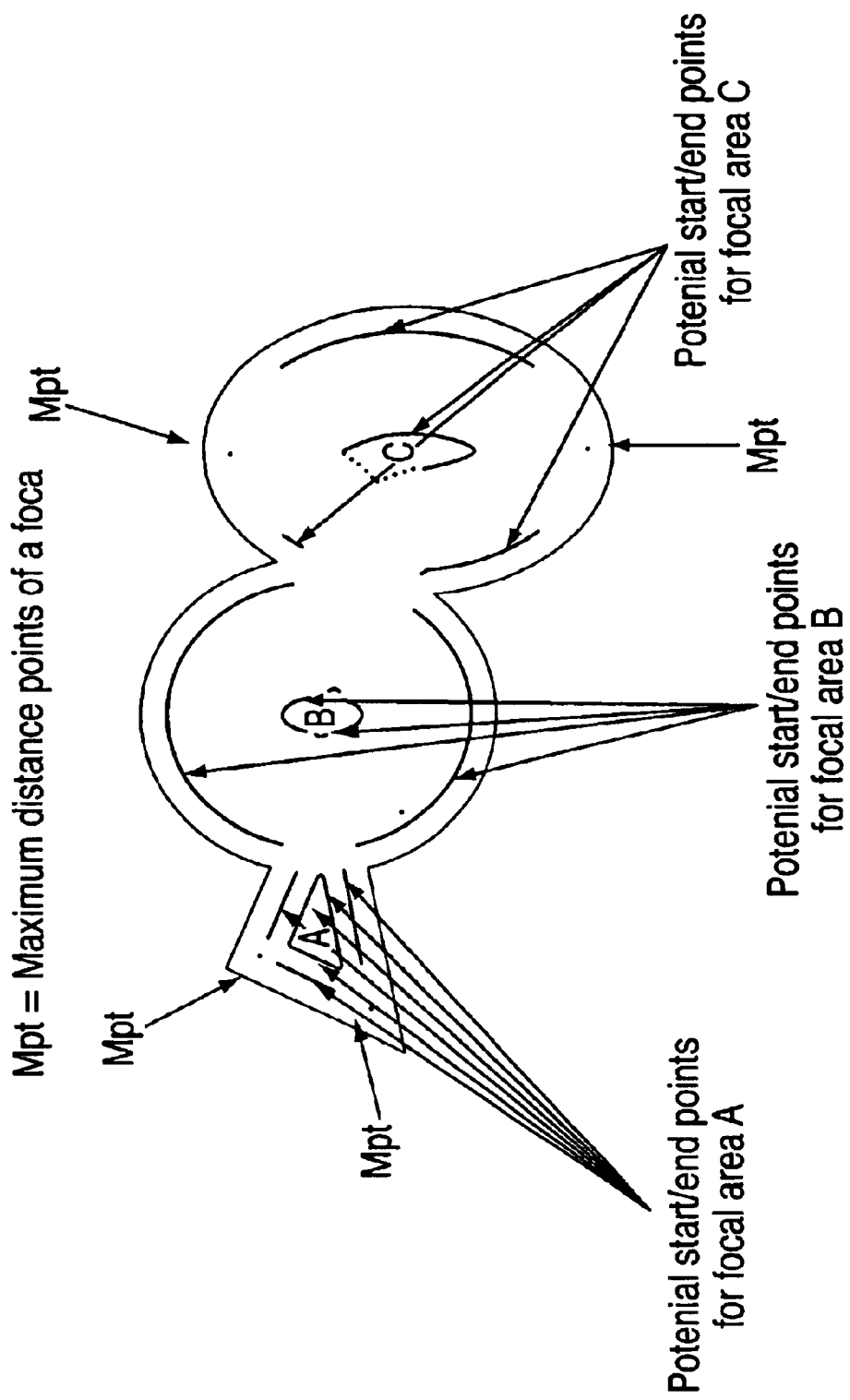
FIG. 7 illustrates a set of potential start and end points for the tool when defining a machining bed.

Points in the contour which are at the greatest distance from their respective focal areas can also be determined. They are useful for determining the distance between passes measured in the corners of the pocket, as this distance is usually greater than the distance between passes measured on the sides of the pocket. To ensure a satisfactory distance in the corners (which limits the cutting effort of the tool), the distance chosen may be corrected (made shorter) to take into account the extreme corner distances. FIG. 7 shows the positions of the possible start and end points, while the arrows point to the maximum distance points ("Mpt"). Determining the location of such points is not an absolute necessity, but users may prefer to have it taken into account to limit the cutting effort of the tool, particularly in the case of irregularly shaped pockets.

General Overview of the Method of the Present Invention

The overall method of the invention is described with reference to FIG. 8. Each of the steps of the invention depicted generally on FIG. 8 will be described in more detail following the general overview presented herein.

Figure 8:
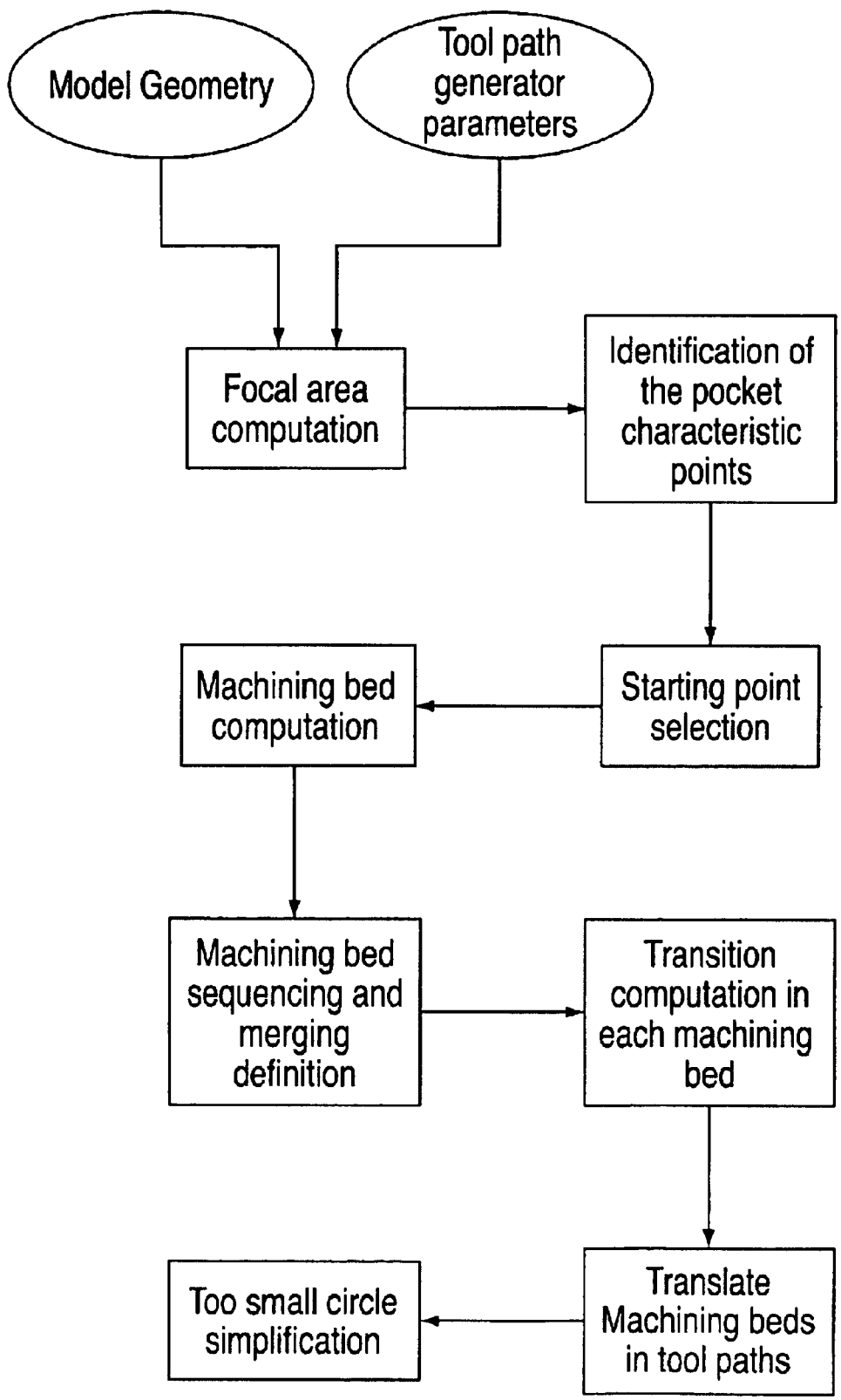
FIG. 8 is an illustration in flow chart form of the overall method of the present invention.

Referring to FIG. 8, the geometry of the pocket to be machined is assumed to be sufficiently described through standard techniques widely known in the art, such as by reference to a Cartesian coordinate system. Also, the basic parameters of the process are assumed to be known. These include: the dimensions of the tool, the recovering coefficient (to be described below), the minimum cornerization radius, the minimum and standard distances between passes and also whether the standard distance is measured in the corners or with respect to the reference edge.

The first step is the determination of the focal areas of the pocket (focal area computation). The next step is the determination of the characteristic points, i.e., start points, and maximum distance points, the latter if required.

Figure 5:
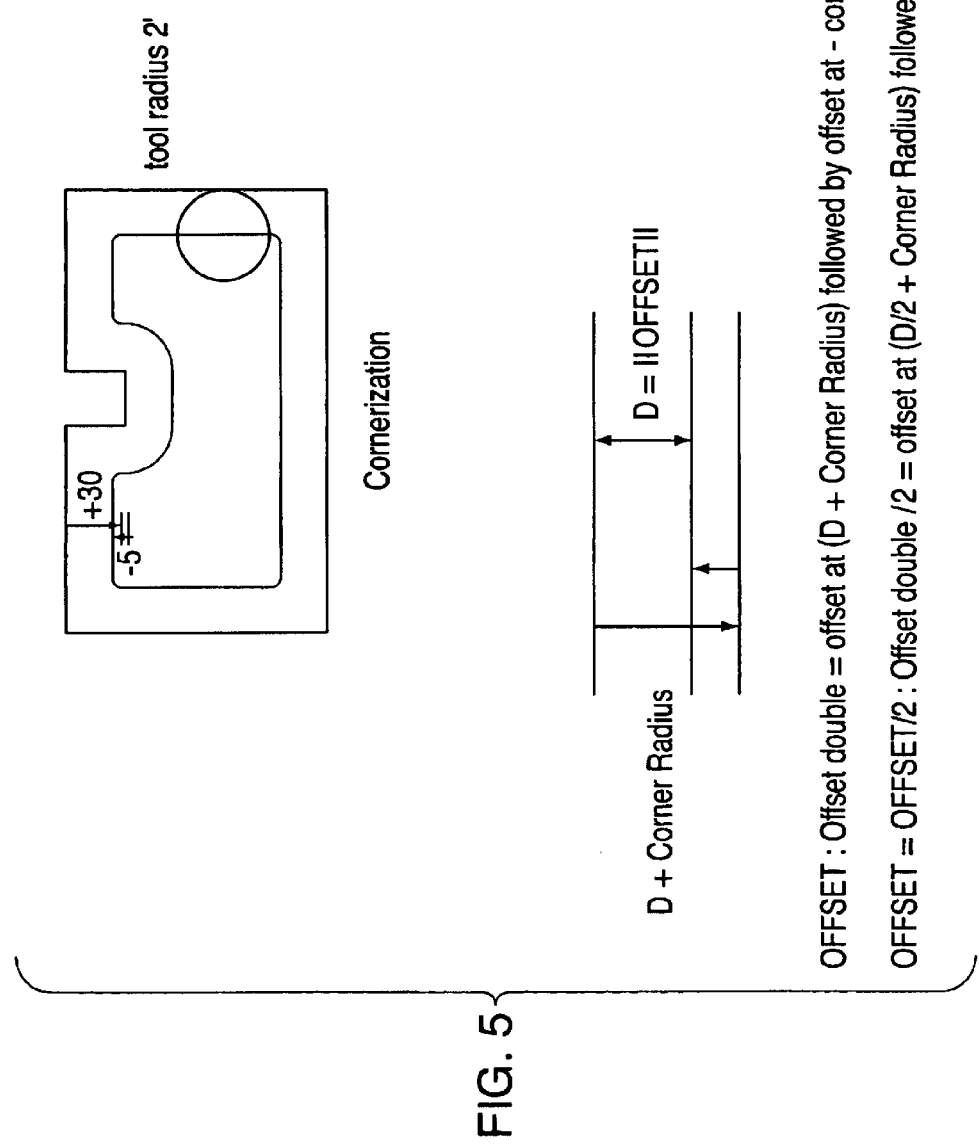
FIG. 5 illustrates the concept of "cornerization", wherein the offset distance is modified to prevent sharp corners in the toolpath.
Figure 6A:
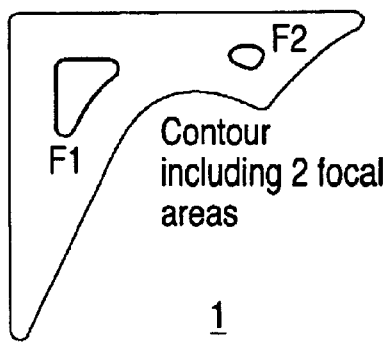
FIG. 6 illustrates the process by which a contour is modified so as not to come too close to a focal area.
Figure 6B:
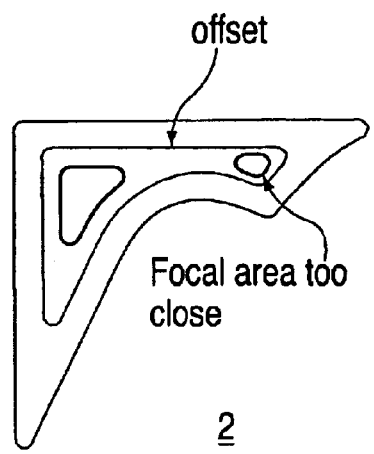
Figure 6C:
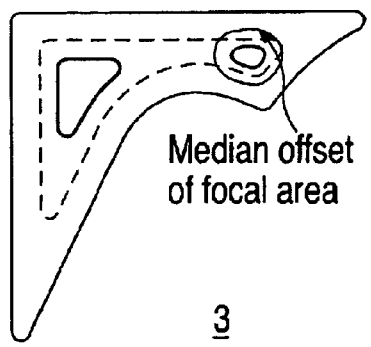
Figure 6D:
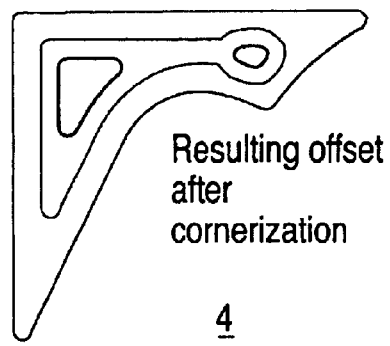

The machining beds are then determined (machining bed computation). This involves the following steps:

Applying the cornerization technique to the contour of the machining bed (e.g., see FIG. 5 where (−30 mm, +5 mm) is used as an example).

Taking into account the focal areas, both type 1 and type 2.

Adding extra segments, or "beaks" if required.

Capturing the selected start point (inward motion) or end point (outward motion).

Defining the access ramp.

Defining the arc of circle supporting the exit helix.

The next step is the ordering and merging, as appropriate, of the machining beds. Then the internal transitions within each machining bed are determined and the machining beds are transformed into actual tool trajectories by opening the contours and incorporating the transitions.

The process results in a complete geometrical description of the tool trajectory, which can then be translated in an appropriate format, such as APT or CIfile, for producing the program code to be fed to the machine controller.

Additional information may be fed to the controller, such as feedrate information taking into account variations in the quantity of material to be cut at various points along the trajectory.

Focal Area Computation

Figure 9:
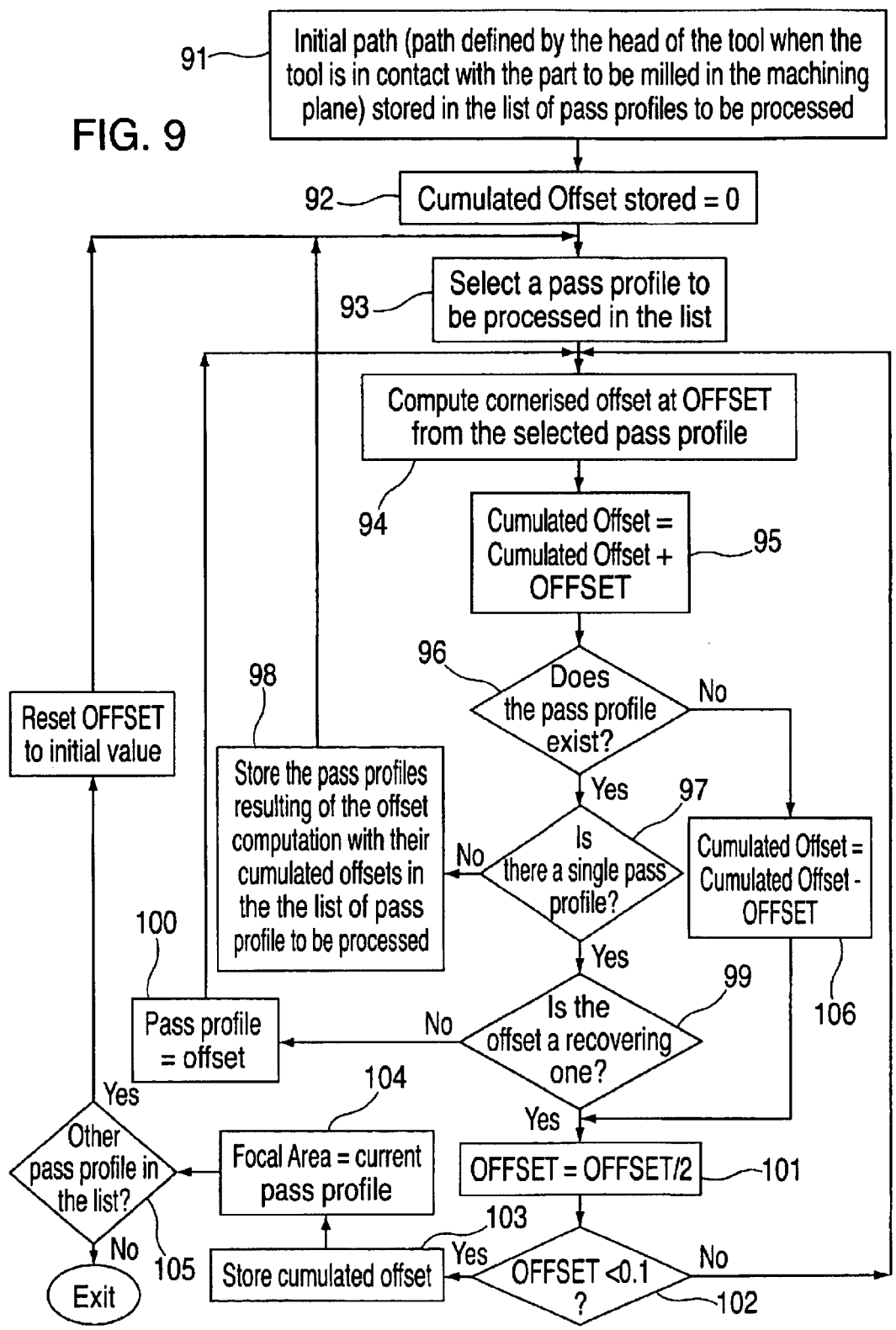
FIG. 9 is an illustration in flow chart form of the method of defining focal areas, in accordance with the present invention.

The method of determining the focal area(s) is described with reference to FIG. 9. Depicted therein is a method of determining the location of focal areas using a process wherein we begin with a pass profile, or contour, that would be followed by the cutting tool so as to cut the outer contour of the pocket. This defines the initial path, which is stored in the list of pass profiles to be processed (step 91). A value for the cumulated offset is initialized to a value of zero (step 92), and a pass profile is selected from the list of pass profiles to be processed (step 93). At this stage there is only one pass profile to be processed, i.e., the initial path. In the next step (step 94) an "offset", or new pass profile is generated by tracing a pass inside the initial path and offset from the initial path by a certain distance, i.e., an "OFFSET" distance, corresponding to the offset value that has been selected by the user. As discussed above, this value preferably is close to but not more than the diameter of the cutting tool. In the event that this new pass profile has corner(s) which violate the minimum cornerization radius, the cornerization technique discussed above is used to modify ("cornerize") the new pass profile. Once the new cornerized pass has been computed, the value for the cumulated offset variable is updated by adding the value of OFFSET (step 95), and a query is made (step 96) as to whether the pass profile exists. At this point we will take the case where the answer to query 96 is yes. The negative will be addressed below.

Proceeding to step 97, the query is whether a single pass profile has been generated. As discussed above, when a new contour is drawn inside an existing contour, occasionally the new contour will overlap itself, which is the case when portions of the previous contour are within two offset values of each other. As explained above, to prevent an overlap, the new contour is connected to itself at the point of overlap, which leads to the formation of two or more separate contours, rather than one single continuous contour. If that is the case, then the answer to the query 97 is "no", since there is in fact more than one single pass profile. If that is the case, then each of the computed pass profiles is stored (step 98) in the list of pass profiles to be processed, together with their respective cumulated offset values. These new pass profiles will form the basis for further processing beginning again at step 93.

Figure 11:
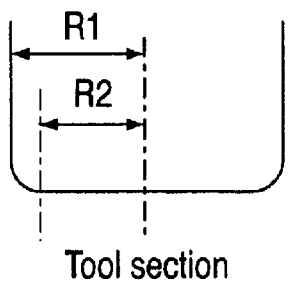
FIG. 11 illustrates alternative methods of determining a recovering radius, in accordance with the present invention.
Figure 10:
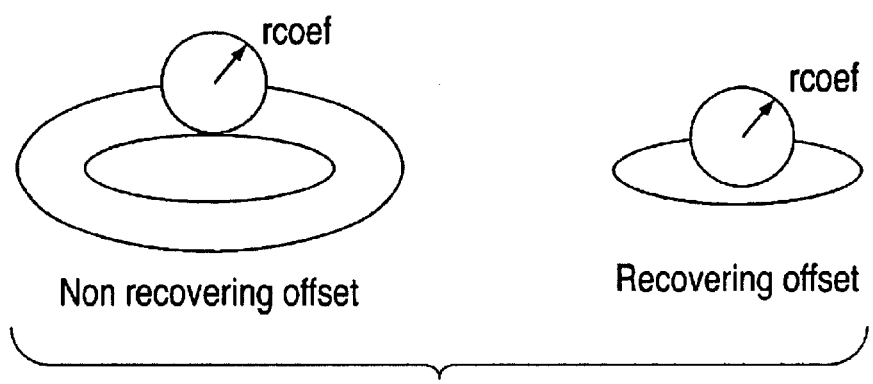
FIG. 10 illustrates the difference between a recovering offset and a non-recovering offset, in accordance with the present invention.

On the other hand, if only a single pass profile is generated (step 97, "yes"), then an inquiry is made as to whether or not the offset is a "recovering" offset (step 99). Referring to FIG. 10, a recovering offset is one which would cause the tool to retrace its path over previously cut material. If the pass profile is not a recovering pass profile, then the pass profile computed in step 94 is set as the pass profile from which yet another pass profile will be computed (step 100), and the process repeats. In other words, the process has not yet reached the focal area and must continue. Referring to FIG. 11, the determination as to whether or not a pass is recovering is determined by using a recovering radius, which can be selected by the user. The radius is a function of either R1, the overall radius of the cutting tool, or R2, the effective full-cut radius of the cutting tool. R1 or R2 is multiplied by a "recovering coefficient" having a value of between zero and one, as determined by the user, to arrive at a value for the recovering radius.

In the event that the computed offset is a recovering offset (FIG. 9, step 99, "yes"), then we know that we have approached the vicinity of the focal area. In this case, the next inwardly-spaced profile cannot be traced using the same value for OFFSET used previously, since such an offset would put the next trace past the center of the focal area, leading to an impossible situation. Therefore, instead of using the same value for OFFSET used previously, we use one half the value of OFFSET for the next pass profile (step 101). This process is continued, using increasingly smaller values for OFFSET (halved each time) until a minimum value for OFFSET is reached (step 102), at which point the cumulated offset value is stored (step 103) and the focal area is defined as the last computed pass profile (step 104). The entire process is then repeated, assuming there are more pass profiles to be processed (step 105).

We now treat the situation where the answer to query 96, i.e., "Does the pass profile exist?", is "no". In that situation, we have reached a point where the offset has traced a pass profile that has gone past the center of the focal area, creating an "impossible" situation in the sense that it does not make sense geometrically. In this situation, we should try again, using half the previous value for OFFSET, to obtain a pass profile that is possible geometrically. Therefore, we reset the value of "cumulated offset" to the value used prior to computing the current pass profile by subtracting the current value of OFFSET from the cumulated offset (step 106), and set OFFSET to one half the value of OFFSET for the next pass profile (step 101).

It must be understood that when we are computing the boundary of the focal area, we are not computing the actual pass profiles to be followed by the tool. The computation of the focal area is used to find the theoretical focal area. The actual pass profiles to be followed by the tool are computed later. They may be, but are not necessarily the same as the pass profiles computed later.

To summarize, to find the focal areas, we begin with an initial pass profile, and then compute a cornerized pass profile spaced away from the initial pass profile by a predefined offset value. The result can be two or more closed pass profiles, in which case we store each pass profile as a new pass profile to be processed. The result can also be a single closed pass profile. If the result is a single closed pass profile, we check to see whether or not it is a recovering profile. If it is not a recovering pass profile, a new pass profile is calculated using as a starting point the pass profile that was just previously calculated, and the cumulated offset value is increased by the offset value. If the pass profile is a recovering pass profile, then the offset value is decreased by one half, and a new pass profile is calculated using the halved offset value. In that case, the cumulated offset value is increased by the halved offset value. This process is continued until the offset value reaches a predetermined minimum. At that point, the cumulated offset value is stored as the cumulated offset value of the focal area, and the last generated pass profile is stored as the focal area. The process is repeated until all of the pass profiles have been processed. The result is a list of offsets corresponding to focal areas together with the cumulated offset values for each focal area.

Identification of the Pocket Characteristic Points

Figure 12:
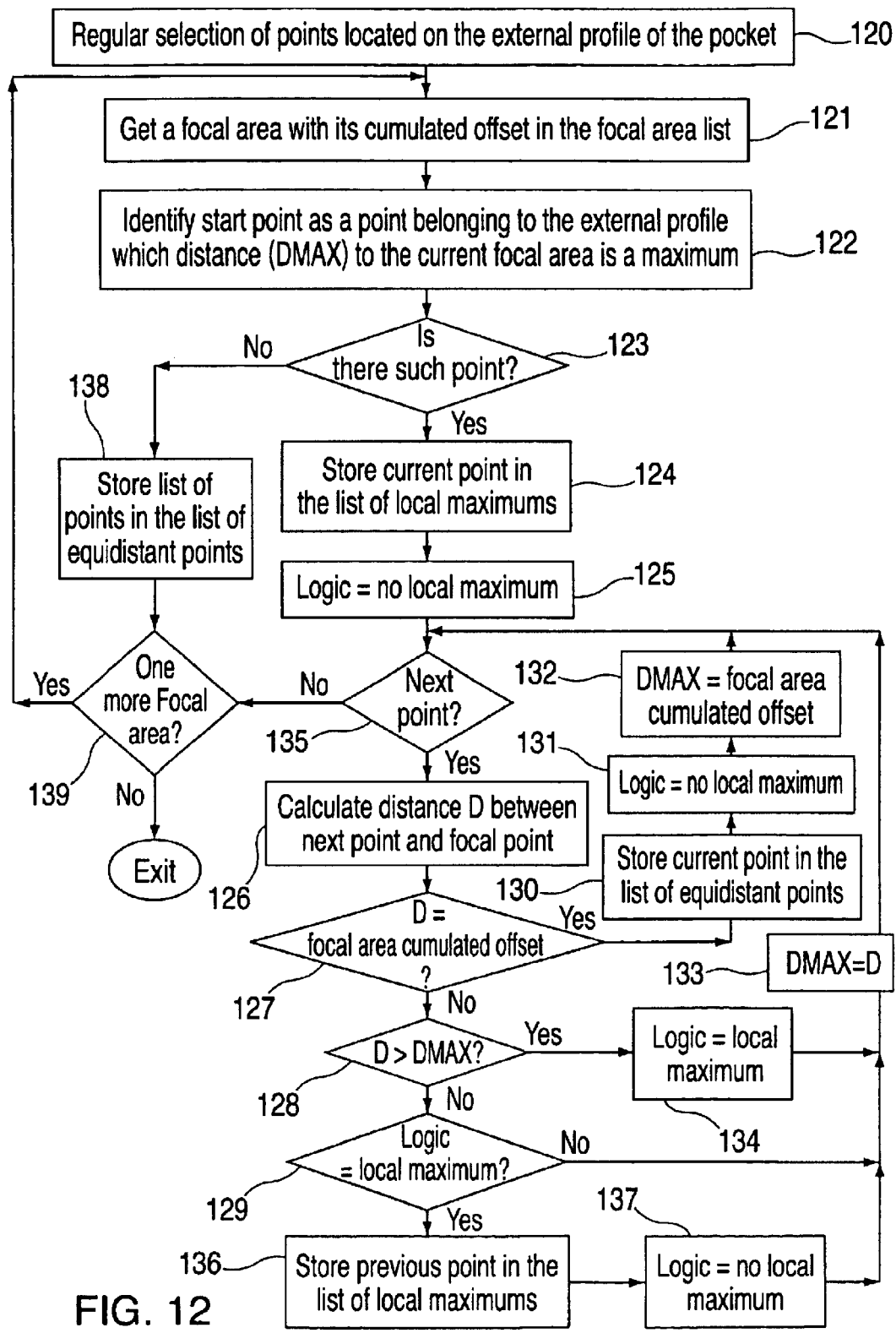
FIG. 12 is an illustration in flow chart form of the method of determining a set of characteristic points for a pocket.

Once the focal areas have been identified, the next step is to identify a set of possible starting and ending points in the pocket. This is described with reference to FIGS. 7 and 12. As described briefly above, the goal is to identify for each focal area a list of points that are a distance from the focal area equal to the focal area cumulated offset (FIG. 7, "potential start/end points"). In the method of FIG. 12, a set of points that are a maximum distance from the. focal area (FIG. 7, Mpt) is also determined.

Therefore, focusing on FIG. 12, in order to begin the process, a set of points are selected along the external profile of the pocket (step 120). A focal area is then selected from a list of focal areas previously generated (step 121), and the system checks whether there is a point whose distance from the external profile is a maximum (steps 122, 123). If not (step 123, "no"), this means that all points are equidistant from the focal area, and the list of points is stored (step 138).

If, however, there is a point whose distance from the external profile to the focal area is a maximum (step 123, "yes"), then this point is used as a starting point, it is stored as a "local maximum" (step 124), and the value for a logic switch "local maximum" is set to "no" (step 125). The next point along the profile is then selected, and its distance to the focal area is determined (126). If the distance is equal to the focal area cumulated offset (step 127, "yes"), then we know that the point is one of the equidistant points at a distance from the focal area equal to the focal area cumulated offset. If that is the case, the point is stored in the list of equidistant points, the logic switch is set to "no local maximum", the value for variable DMAX is set to the focal area cumulated offset, and the process is repeated for the next point (steps 130–132).

If, however, the computed distance is not equal to the focal area cumulated offset (step 127, "no"), we ask whether the computed distance D is greater than variable DMAX (step 128). If so, then it is potentially a local maximum, in which case the logic switch is set to "yes" (there is a local maximum) (step 134), DMAX is reset to match the distance of the point just computed (step 133), and the next point is selected (step 135). This process would continue until a maximum point is reached, at which time the query "D>DMAX" would be "no". If that is the case, then we determine whether the logic switch has been set to "yes" or "no" (step 129). If it had been set to "yes," it means that the process had been following a progression of points with increasing distance "D" from the focal area, and that the last point reached had been a local maximum. If that is the case, the last point reached, i.e., the "previous point," is stored in a list of local maximums (step 136), the logic switch is reset to "no local maximum" (step 137), DMAX is set to the current value for D (step 133), and the process is repeated for the next point (step 135). If there is no further point, the process goes to the next focal area (step 139).

If, on the other had, the logic switch had been set to "no local maximum" (step 129, "no"), then it means that the point is neither an equidistant point, nor is it a local maximum, and the process moves on to the next point.

Machine Bed Computation

Figure 13B:
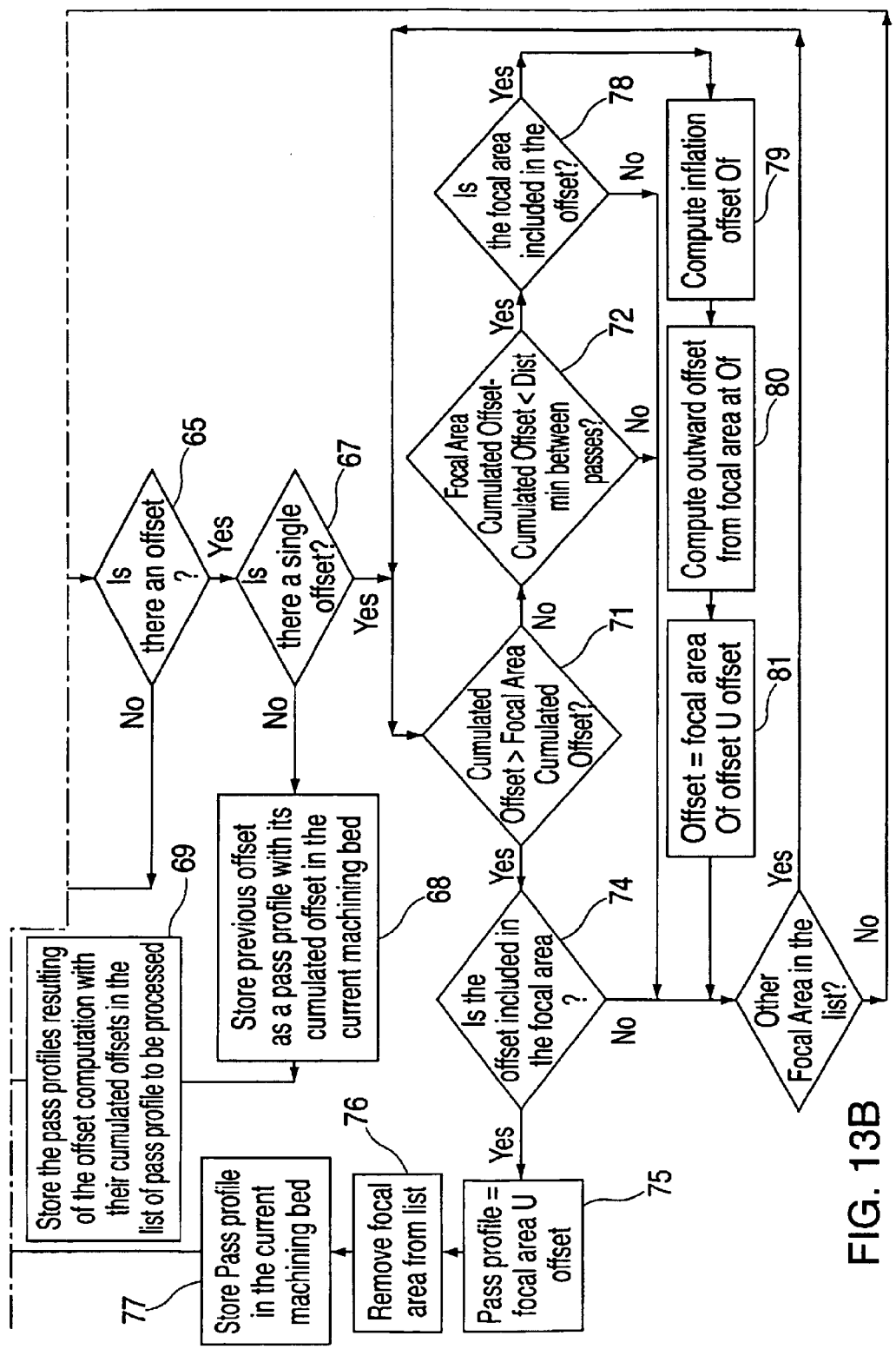
FIG. 13 is an illustration in flow chart form of the method of computing a set of pass profiles defining a machining bed, in accordance with the present invention.

Machine bed computation is described through reference to FIG. 13. As seen therein, we begin by initializing the value for cumulated offset (step 60), resetting the storage for the machine bed (step 61), and selecting a pass profile to begin the process (step 62). A cornerized offset is then computed at a value of OFFSET from the initially selected pass profile, and the value for cumulated offset is updated by adding the value of the OFFSET (steps 63 and 64). In the event that the calculation leads to an impossible profile (step 65), it is ignored, and the previous pass profile is stored as a machining bed (step 66). Otherwise, a query is made as to whether the offset led to the creation of two or more offsets (step 67, "no"). This occurs when, as discussed above, a pass profile intersects with itself, in which case the pass profile is joined together at the intersection, creating more than one pass profile. If two or more offsets are created (step 67, "no"), then the previous pass profile is stored as a machining bed (steps 68 and 70), and each of the offsets resulting form the offset calculation are stored as pass profiles for further processing (step 69).

In the event that only one offset is created, which generally is the normal case, (step 67, "yes"), then we check to see whether the generated offset has fallen within a focal area or has come too close to a focal area. If not, then we know that we must continue calculating inwardly progressing offsets within the machining bed before reaching a focal area. This is neither a Type 1, nor a Type 2 situation, and is seen in the flow chart of FIG. 13 by an answer of "no" to the query of step 71, meaning that we are not within a focal area, and a "no" to the query of step 72, meaning that we have not come too close to a focal area. In this case, the offset is stored as a pass profile in the current machining bed (step 73).

In the event that the offset has traced a profile falling within a focal area (step 71, "yes"; step 74, "yes"), then the cumulated offset value will have exceeded the focal area cumulated focal area offset. This is a Type 1 situation. In this case, the pass profile is defined as the union of the focal area itself and the calculated offset in the vicinity away from the focal area (step 75). In this case, we have reached a focal area, and completely defined a machining bed. Therefore, the focal area is removed from further consideration (step 76), and the completed machining bed is stored (step 77, 70).

Finally, we reach the Type 2 situation, where the offset, while not falling within a focal area, nevertheless, comes closer than the minimum distance between passes (step 71, "no"; step 72, "yes"). In this case, the focal area is deformed with an "inflation offset" "Of", defined as:

Of=(distance between passes+(focal area cumulated offset−cumulated offset))/2

This inflation offset Of is computed at step 79. Then the inflation of the focal area is computed (step 80), as described in relation to FIG. 6c above. At step 81, the appropriate offset is computed as the union of the inflated focal area and the previous too-close offset, as described in relation to FIG. 6d above.

Machining Beds Sequencing and Merging

Once the machining beds have been identified, it is useful to reduce the number of machining beds by merging those that can be merged. By merging machine beds, the number of times the tool must be removed from (retracting) and re-engaged with (ramping) the surface being cut is minimized. It is also useful to sequence the machine beds so that travel between retraction and ramping is minimized.

Figure 14:
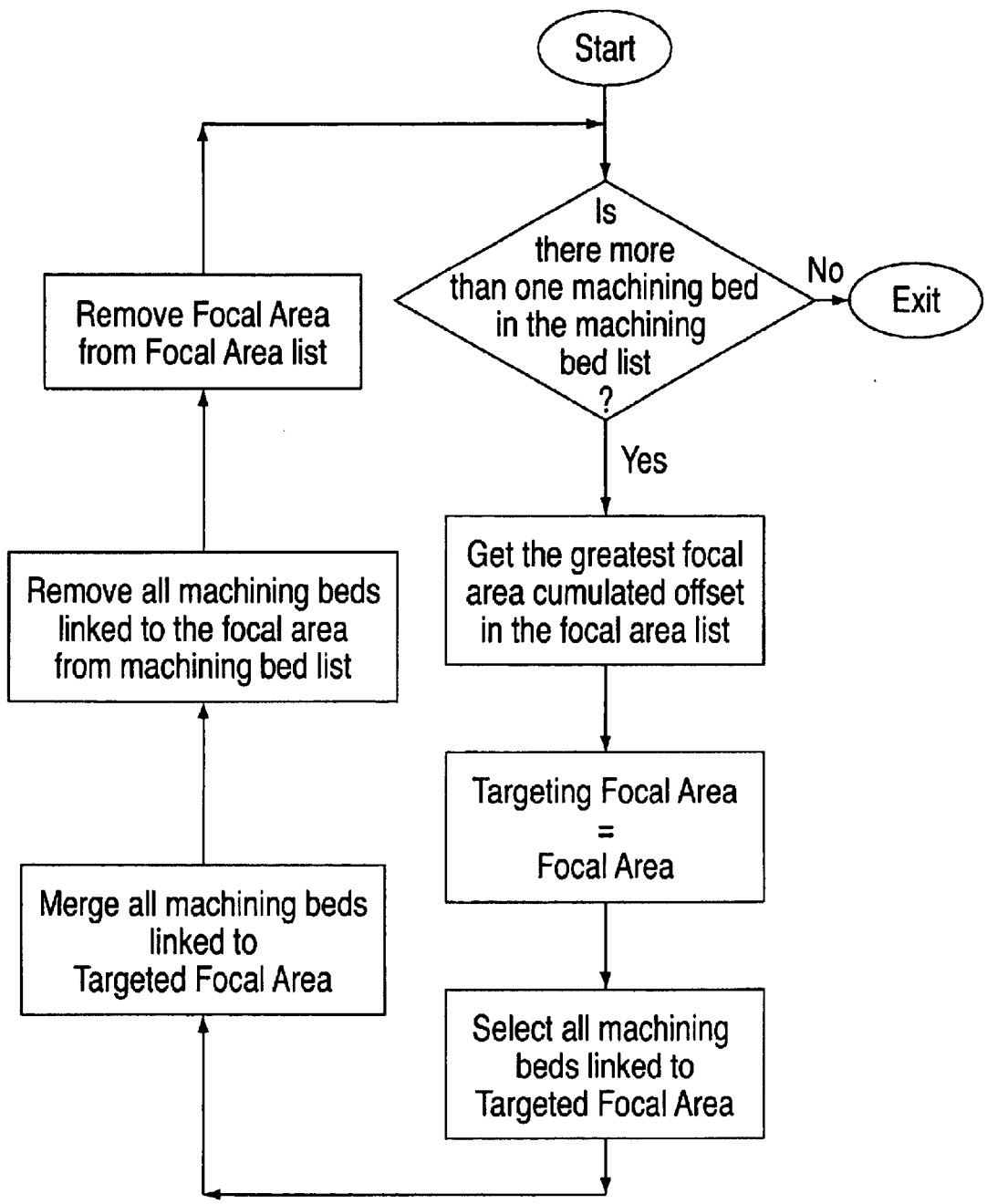
FIG. 14 is an illustration in flow chart form of a method of merging machining beds, in accordance with the present invention.

This process is described with reference to FIG. 14. The first thing to be done is to check the number of machining beds in the machining bed list. If there are several machining beds, for each machining bed, we find the focal area with the greatest focal area cumulated offset. Once found, all machining beds linked to the focal area are merged. The focal area and merged machining beds are removed from consideration, and the process is redone until all machining beds have been processed.

The process described performs sequencing in that it begins with the machining bed having the greatest focal area cumulated offset, and machining beds associated therewith, and moves progressively to machining beds with the next lesser focal area cumulated offset.

It should be understood that other sequencing techniques could be used, for example one that would minimize the travel between retraction and ramping. What is important is that the sequencing is performed.

Transitions Between Pass Profiles

Figure 15:
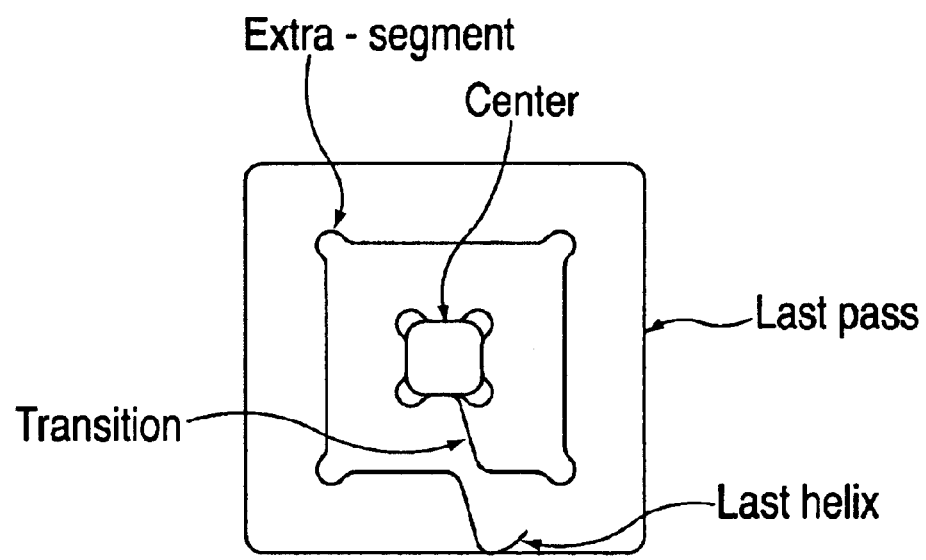
FIG. 15 illustrates a representative machining bed with cutting contours, and shows transitions links between pass profiles.

The machine beds at this stage in the process now each consist of one or more pass profiles. However, the pass profiles are not yet connected. We need to define the path of the tool so that when the tool has completed cutting a pass profile, it moves to the next pass profile smoothly, that is, without going through any sharp corners, and always continues to cut material, so as not to shock load the cutting tool. The path to be followed between pass profiles in a machining bed are called transitions, and a representative example is shown in FIG. 15.

Figure 16:
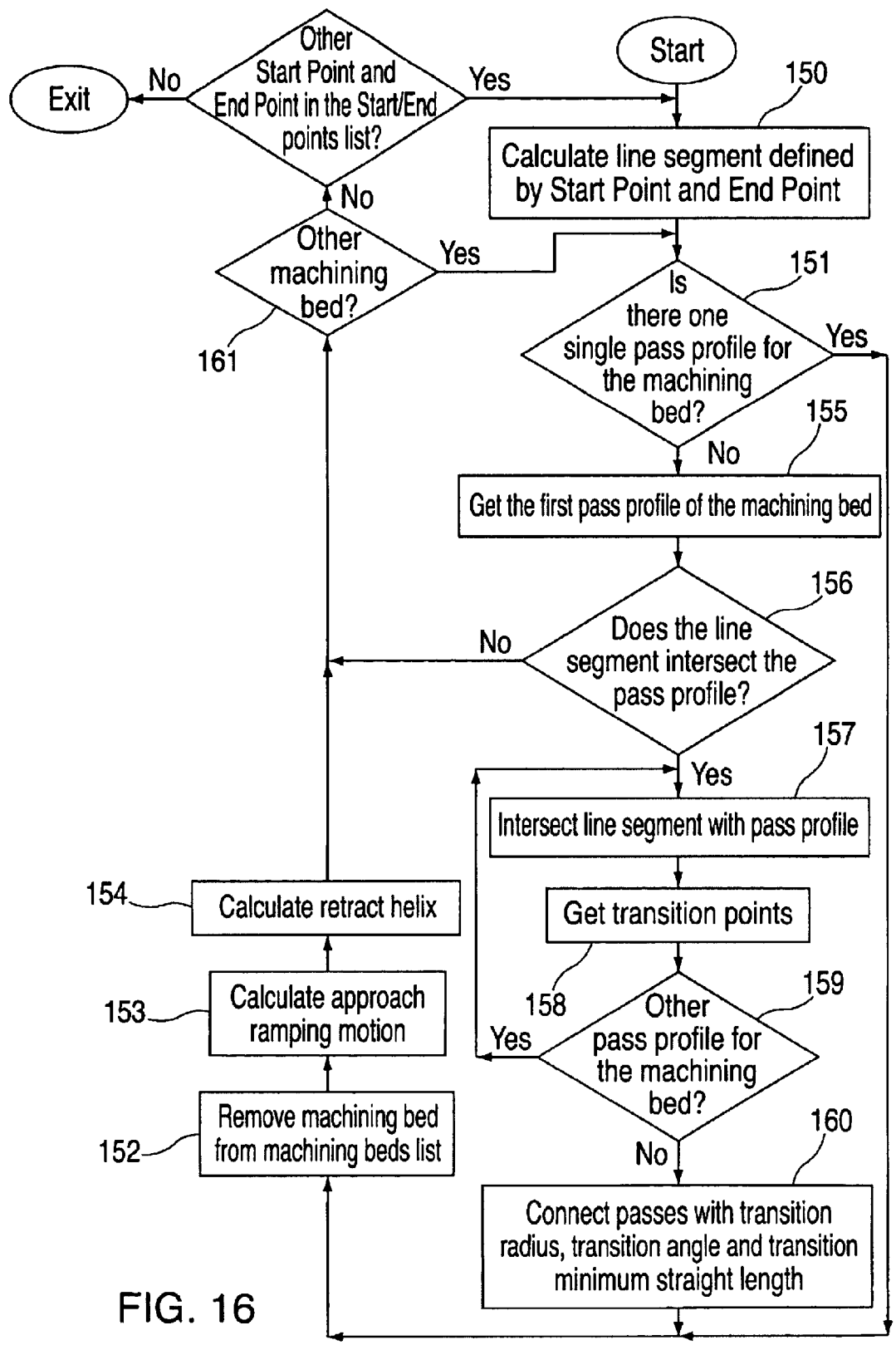
FIG. 16 is an illustration in flow chart form of a method of calculating transition points, according to the present invention.

Referring to FIG. 16, the process of linking pass profiles in a machining bed is described. We begin by defining a line that connects a start point and an end point of a machining bed (step 150). Determination of start and end points was described above with reference to FIG. 12, and is illustrated in FIG. 2. We then determine whether or not there is more than one pass profile in the machining bed. If there is just one pass profile (step 151, "yes"), then we remove the machining bed from the list of beds to be processed (step 152), and we calculate the approach ramping motion (step 153) and retraction helix (step 154).

Figure 17:
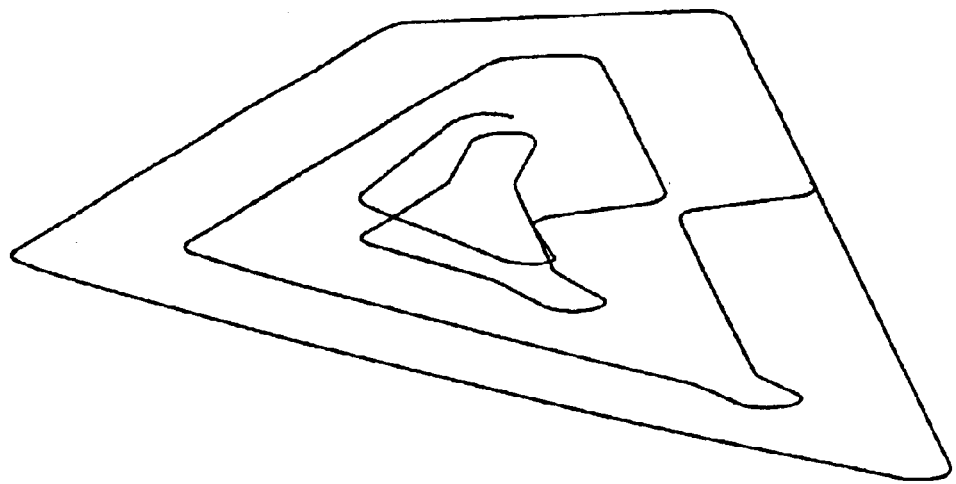
FIG. 17 is a graphic depiction of an approach ramping motion to be followed by a cutting tool in engaging a part.

An approach ramp is the toolpath employed to enter a machining area. It is used to allow progressive penetration into the material in an even manner so as not to overload the cutting tool. A representative approach ramp is shown in the three dimensional elevation of a planar contour shown in FIG. 17.

Figure 18:
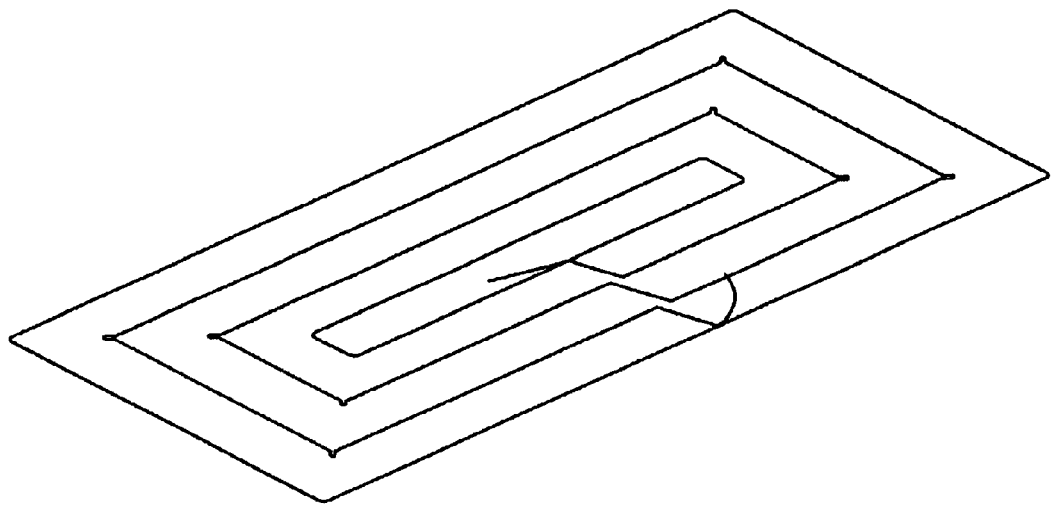
FIG. 18 is a graphic depiction of a retraction helix to be followed by a cutting tool in disengaging from a part.

A retraction helix is the toolpath employed when leaving a machining bed. A representative retraction helix is shown in FIG. 18. In the preferred embodiment, the retraction helix is based on a planar circle, whereby the toolpath elevates and leaves the part progressively.

Figure 19:
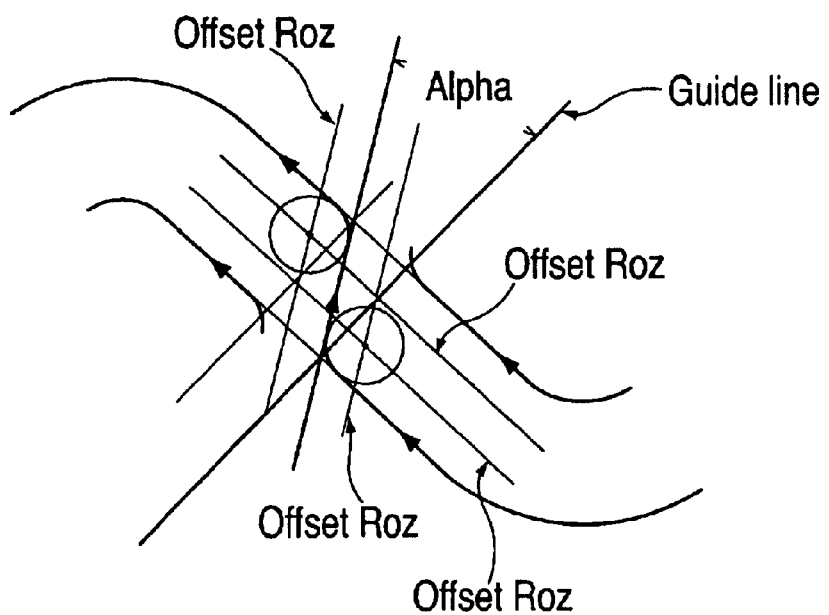
FIG. 19 illustrates the geometric parameters used in calculating a transition between pass profiles.

Referring again to FIG. 15, in the event that there is more than one pass profile in the machining bed (step 151, "no"), we intersect the guide line with each pass profile in the machining bed to get a set of transition points (steps 155–159). The transition points form the start point for transitions between pass profiles. The transitions themselves are defined by drawing a line between pass profiles beginning at a transition point and at a predetermined angle (alpha) to the guide line. This is shown in FIG. 19. To prevent sharp corners in the toolpath, a transition radius is applied linking the transition and the pass profiles. Once all of the pass profiles have been linked with transitions (step 160), the approach ramps and retraction helixes are calculated, and the process is repeated for each start/end point, and each remaining machining bed (step 161).

Creation of Toolpath

Figure 20:
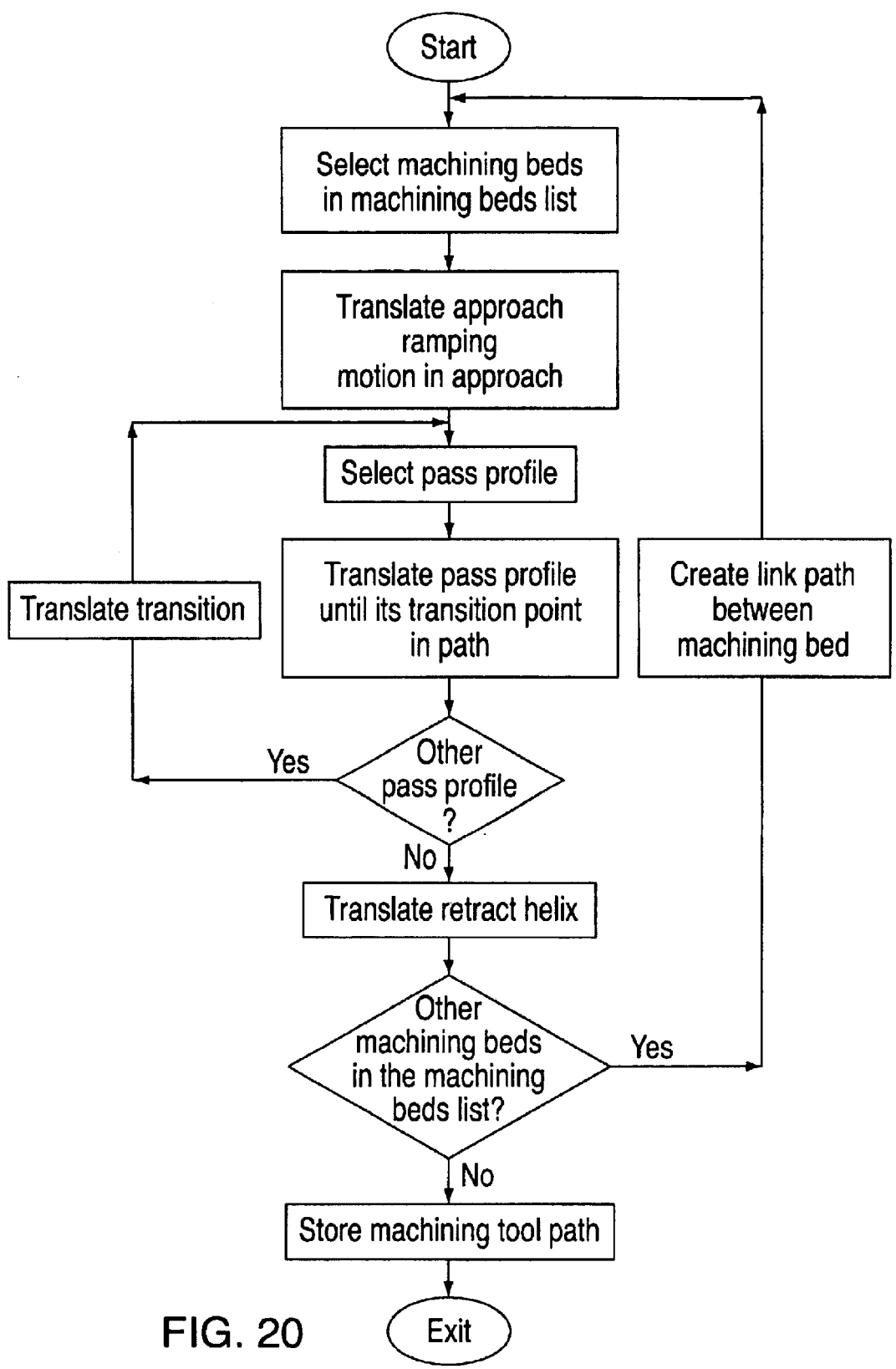
FIG. 20 is an illustration in flow chart form of a method of translating pass profiles, transitions, approach ramping motions, and retraction helixes, to define a toolpath, in accordance with the present invention.
Figure 21:
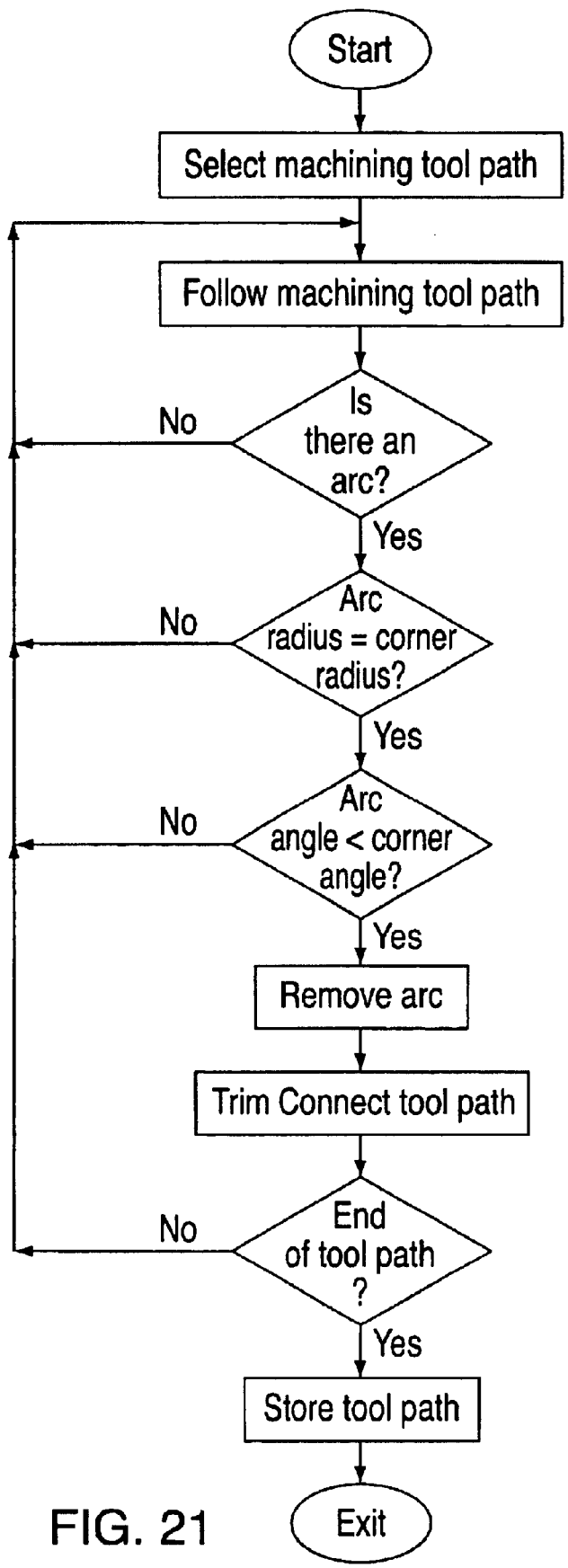
FIG. 21 is an illustration in flow chart form of a method for altering the toolpath so that minimum arc angles and corner radii are respected.

At this stage in the process, we have defined for each machining bed a ramping motion, a set of pass profiles, a set of transitions connecting the pass profiles, and a retraction helix. In the next step of the invention, this information is put together to create a toolpath within each machining bed, and the toolpaths for each machining bed are connected with links. The end result is one toolpath, which will cut the desired pocket in the part from start to finish. A method of performing this linking is depicted in FIG. 20. Once the entire toolpath has been defined, we may also check the toolpath to ensure that none of the arcs in the toolpath falls below a predefined arc radius. In addition, we check to see whether the angle between the two radii joining the extremities of an arc to the center of the circle to which the arc belongs ("arc angle") falls below a predefined corner angle. If so, the arc is removed and replaced with straight extensions of the preceding and following arcs along the tangents to these arcs. A method of performing this check is illustrated in FIG. 21.

The end result of the foregoing process defines a toolpath in which the tool never traces a path undergoing a change in direction below a minimum corner radius, all material is cut, the tool is never in a situation where it suddenly encounters an area already cut, the tool approaches and leaves the cutting area in a manner that loads the tool gradually, the toolpath length is minimized, and the tool speed can be operated at its rated speed without slowing down. The toolpath is described numerically and the information can be recorded electronically to be sent to numerically controlled HSM machines.

It is to be understood that the foregoing method can be applied to any milling machine compatible with CAD/CAM/CAE systems. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A computer system operation method for use with a system for defining a path of a tool for cutting a pocket in a part in a milling situation, the method comprising:

computing one or more focal areas for said pocket, said focal area comprising a relative centroid for a portion of the pocket to be cut;

identifying a set of potential start and end points within said pocket for the milling process and selecting a start point;

computing one or more machining beds each comprising one or more pass profiles;

merging machining beds linked to a single focal area;

computing transitions between pass profiles within each merged machining bed;

calculating a tool path within each merged machining bed by linking said pass profiles within said merged machining bed with said transitions; and linking machining beds.

2. The method of claim 1, wherein said computation of said focal areas comprises:

a) selecting as an initial pass profile a contour that would be followed by a cutting tool of a milling machine so as to cut the outer contour of the pocket, and storing said pass profile as the current pass profile;

b) calculating a new pass profile by tracing a pass inside the previous pass profile at an offset distance from the initial path profile, and storing said new pass profile as the current pass profile;

c) if the new pass profile calculated in step (b) is a recovering pass profile, decreasing the offset distance;

d) performing steps b) to c) until a minimum value for the offset distance is reached; and e) defining the focal area as the current pass profile.

3. A computer system operation method for use with a system for defining a path of a tool for cutting a pocket in a part in a milling situation, the method comprising:

computing one or more focal areas for said pocket;

identifying a set of potential start and end points within said pocket for the milling process and selecting a start point;

computing one or more machining beds each comprising one or more pass profiles wherein said computation of said machining bed comprises:

a) designating a storage location for storing one or more pass profiles defining a machining bed, selecting an initial pass profile, and designating said initial pass profile as a current pass profile;

b) calculating a new pass profile at an offset distance from the current pass profile;

c) if the new pass profile is included in a focal area, reshaping the new pass profile as the union of i) the focal area in the vicinity of the focal area, and ii) the new pass profile in an area away from the vicinity of the focal area, and storing said reshaped new pass profile in the machining bed;

d) if the new pass profile is not included in a focal area and is within a minimum distance between pass profiles as defined by a user, inflating the focal area, and reshaping the new pass profile as the union of i) the inflated focal area in the vicinity of the focal area, and ii) the new pass profile in the area away from the vicinity of the focal area, and storing said reshaped new pass profile in the machining bed;

e) if the new pass profile is not included in a focal area and is not within a minimum distance between pass profiles as defined by the user, storing said new pass profile in the machining bed and designating said new pass profile as the current pass profile; and f) repeating steps b) to f) until a reshaped new pass profile is created in step c) or d);

merging machining beds linked to a single focal area;

computing transitions between pass profiles within each merged machining bed;

calculating a tool path within each merged machining bed by linking said pass profiles within said merged machining bed with said transitions; and linking machining beds.

4. A computer data signal embodied in a digital data stream comprising data representing a toolpath to be followed by a cutting tool of a milling machine for cutting a pocket in a part, wherein the computer data signal is generated by the method comprising the steps of:

computing one or more focal areas for said pocket, said focal area comprising a relative centroid for a portion of the pocket to be cut;

identifying a set of potential start and end points within said pocket for the milling process and selecting a start point;

computing one or more machining beds each comprising one or more pass profiles;

merging machining beds linked to a single focal area;

computing transitions between pass profiles within each merged machining bed;

calculating a tool path within each merged machining bed by linking said pass profiles within said merged machining bed with said transitions; and linking machining beds.

5. The computer data signal embodied in a digital data stream of claim 4, wherein said method of computation of said focal areas comprises:

a) selecting as an initial pass profile a contour that would be followed by a cutting tool of a milling machine so as to cut the outer contour of the pocket, and storing said pass profile as a current pass profile;

b) calculating a new pass profile by tracing a pass inside a previous pass profile at an offset distance from the initial path profile, and storing said new pass profile as the current pass profile;

c) if the new pass profile calculated in step (b) is a recovering pass profile, decreasing the offset distance;

d) performing steps b) to c) until a minimum value for the offset distance is reached; and e) defining the focal area as the current pass profile.

6. A computer data signal embodied in a digital data stream comprising data representing a toolpath to be followed by a cutting tool of a milling machine for cutting a pocket in a part, wherein the computer data signal is generated by the method comprising the steps of:

computing one or more focal areas for said pocket;

identifying a set of potential start and end points within said pocket for the milling process and selecting a start point;

computing one or more machining beds each comprising one or more pass profiles wherein said method of computation of said machining bed comprises:

a) designating a storage location for storing one or more pass profiles defining a machining bed, selecting an initial pass profile, and designating said initial pass profile as a current pass profile;

b) calculating a new pass profile at an offset distance from the current pass profile;

c) if the new pass profile is included in a focal area, reshaping the new pass profile as the union of i) the focal area in the vicinity of the focal area, and ii) the new pass profile in an area away from the vicinity of the focal area, and storing said reshaped new pass profile in the machining bed;

d) if the new pass profile is not included in a focal area and is within a minimum distance between pass profiles as defined by a user, inflating the focal area, and reshaping the new pass profile as the union of i) the inflated focal area in the vicinity of the focal area, and ii) the new pass profile in the area away from the vicinity of the focal area, and storing said reshaped new pass profile in the machining bed;

e) if the new pass profile is not included in a focal area and is not within a minimum distance between pass profiles as defined by the user, storing said new pass profile in the machining bed and designating said new pass profile as the current pass profile; and f) repeating steps b) to f) until a reshaped new pass profile is created in step c) or d);

merging machining beds linked to a single focal area;

computing transitions between pass profiles within each merged machining bed;

calculating a tool path within each merged machining bed by linking said pass profiles within said merged machining bed with said transitions; and linking machining beds.

7. A CAD/CAM/CAE apparatus comprising:

a central processing unit;

a memory device for storing data; and an output device;

wherein the central processing unit runs an application program comprising code prescribing a method for determining the path to be followed by a cutting tool of a milling machine for cutting a pocket in a part, said method comprising:

computing one or more focal areas for said pocket, said focal area comprising a relative centroid for a portion of the pocket to be cut;

identifying a set of potential start and end points within said pocket for the milling process and selecting a start point;

computing one or more machining beds each comprising one or more pass profiles;
merging machining beds linked to a single focal area;
computing transitions between pass profiles within each merged machining bed;
calculating a tool path within each merged machining bed by linking said pass profiles within said merged machining bed with said transitions; and
linking machining beds.

8. The CAD/CAM/CAE apparatus of claim 7, wherein said method of computation of said focal areas comprises:

a) selecting as an initial pass profile a contour that would be followed by a cutting tool of a milling machine so as to cut the outer contour of the pocket, and storing said pass profile as a current pass profile;
b) calculating a new pass profile by tracing a pass inside a previous pass profile at an offset distance from the initial path profile, and storing said new pass profile as the current pass profile;
c) if the new pass profile calculated in step (b) is a recovering pass profile, decreasing the offset distance;
d) performing steps b) to c) until a minimum value for the offset distance is reached; and
e) defining the focal area as the current pass profile.

9. A CAD/CAM/CAE apparatus comprising:

a central processing unit;
a memory device for storing data; and
an output device;
wherein the central processing unit runs an application program comprising code prescribing a method for determining the path to be followed by a cutting tool of a milling machine for cutting a pocket in a part, said method comprising:
computing one or more focal areas for said pocket;
identifying a set of potential start and end points within said pocket for the milling process and selecting a start point;
computing one or more machining beds each comprising one or more pass profiles wherein said method of computation of said machining bed comprises:
a) designating a storage location for storing one or more pass profiles defining a machining bed, selecting an initial pass profile, and designating said initial pass profile as a current pass profile;
b) calculating a new pass profile at an offset distance from the current pass profile;
c) if the new pass profile is included in a focal area, reshaping the new pass profile as the union of i) the focal area in the vicinity of the focal area, and ii) the new pass profile in an area away from the vicinity of the focal area, and storing said reshaped new pass profile in the machining bed;
d) if the new pass profile is not included in a focal area and is within a minimum distance between pass profiles as defined by a user, inflating the focal area, and reshaping the new pass profile as the union of i) the inflated focal area in the vicinity of the focal area, and ii) the new pass profile in the area away from the vicinity of the focal area, and storing said reshaped new pass profile in the machining bed;
e) if the new pass profile is not included in a focal area and is not within a minimum distance between pass profiles as defined by the user, storing said new pass profile in the machining bed and designating said new pass profile as the current pass profile; and
f) repeating steps b) to f) until a reshaped new pass profile is created in step c) or d);
merging machining beds linked to a single focal area;
computing transitions between pass profiles within each merged machining bed;
calculating a tool path within each merged machining bed by linking said pass profiles within said merged machining bed with said transitions; and
linking machining beds.

10. Computer executable code stored on a computer readable medium, the code comprising means for causing a computer to define a path of a tool for cutting a pocket in a part in a milling situation, said code further comprising means for causing a computer to execute the method comprising:

computing one or more focal areas for said pocket, said focal area comprising a relative centroid for a portion of the pocket to be cut;
identifying a set of potential start and end points within said pocket for the milling process and selecting a start point;
computing one or more machining beds each comprising one or more pass profiles;
merging machining beds linked to a single focal area;
computing transitions between pass profiles within each merged machining bed;
calculating a tool path within each merged machining bed by linking said pass profiles within said merged machining bed with said transitions; and
linking machining beds.

11. The computer executable code of claim 10, wherein said code further causes said computer to take steps for computing said focal areas comprising:

a) selecting as an initial pass profile a contour that would be followed by a cutting tool of a milling machine so as to cut the outer contour of the pocket, and storing said pass profile as the current pass profile;
b) calculating a new pass profile by tracing a pass inside a previous pass profile at an offset distance from the initial path profile, and storing said pass profile as the current pass profile;
c) if the pass profile calculated in step (b) is a recovering pass profile, decreasing the offset distance;
d) performing steps b) to c) until a minimum value for the offset distance is reached; and
e) defining the focal area as the current pass profile.

12. Computer executable code stored on a computer readable medium, the code comprising means for causing a computer to define a path of a tool for cutting a pocket in a part in a milling situation, said code further comprising means for causing a computer to execute the method comprising:

computing one or more focal areas for said pocket;
identifying a set of potential start and end points within said pocket for the milling process and selecting a start point;
computing one or more machining beds each comprising one or more pass profiles said code further causes said computer to takes steps for computing said machining bed comprising:
a) designating a storage location for storing one or more pass profiles defining a machining bed, selecting an initial pass profile, and designating said initial pass profile as a current pass profile;

b) calculating a new pass profile at an offset distance from the current pass profile;

c) if the new pass profile is included in a focal area, reshaping the new pass profile as the union of i) the focal area in the vicinity of the focal area, and ii) the new pass profile in an area away from the vicinity of the focal area, and storing said reshaped new pass profile in the machining bed;

d) if the new pass profile is not included in a focal area and is within a minimum distance between pass profiles as defined by a user, inflating the focal area, and reshaping the new pass profile as the union of i) the inflated focal area in the vicinity of the focal area, and ii) the new pass profile in the area away from the vicinity of the focal area, and storing said reshaped new pass profile in the machining bed;

e) if the new pass profile is not included in a focal area and is not within a minimum distance between pass profiles as defined by the user, storing said new pass profile in the machining bed and designating said new pass profile as the current pass profile; and f) repeating steps b) to f) until a reshaped new pass profile is created in step c) or d;

merging machining beds linked to a single focal area;

computing transitions between pass profiles within each merged machining bed;

calculating a tool path within each merged machining bed by linking said pass profiles within said merged machining bed with said transitions; and linking machining beds.

* * * * *